United States Patent
Liu et al.

(10) Patent No.: US 7,115,013 B2
(45) Date of Patent: Oct. 3, 2006

(54) METHOD FOR MAKING A CARBON NANOTUBE-BASED FIELD EMISSION DISPLAY

(75) Inventors: Liang Liu, Beijing (CN); Shou Shan Fan, Beijing (CN)

(73) Assignees: Tsinghua University, Beijine (CN); Hon Hai Precision Ind. Co., Ltd., Tu-Cheng (TW)

( * ) Notice: Subject to any disclaimer, the term of this patent is extended or adjusted under 35 U.S.C. 154(b) by 131 days.

(21) Appl. No.: 10/810,151

(22) Filed: Mar. 26, 2004

(65) Prior Publication Data
US 2004/0192152 A1 Sep. 30, 2004

(30) Foreign Application Priority Data
Mar. 26, 2003 (CN) ................. 03 1 14065

(51) Int. Cl.
*H01J 9/00* (2006.01)
*H01J 9/04* (2006.01)
(52) U.S. Cl. ............... 445/50; 445/24; 445/51
(58) Field of Classification Search .......... 445/50
See application file for complete search history.

(56) References Cited
U.S. PATENT DOCUMENTS
6,232,706 B1  5/2001  Dai et al.
6,515,415 B1  2/2003  Han et al.
2003/0044537 A1  3/2003  Chang et al.
2004/0192153 A1*  9/2004  Liu et al. ............ 445/51

* cited by examiner

*Primary Examiner*—Mariceli Santiago
*Assistant Examiner*—Anne M Hines
(74) *Attorney, Agent, or Firm*—Wei Te Chung

(57) ABSTRACT

A method for making a carbon nanotube-based field emission display device includes the following steps: providing an insulative layer (22) having a first surface; depositing a layer of catalyst (26) on the first surface of the insulative layer; forming a spacer (28) having a number of openings therein such that patterned areas of the layer of catalyst are exposed in the openings; forming arrays of carbon nanotubes (30) extending from the layer of catalyst in the openings; forming a cathode electrode (34) on a top of each of the arrays of carbon nanotubes; forming gate electrodes (40) on a second, opposite surface of the insulative layer offset from the patterned areas; removing portions of the insulative layer corresponding to the arrays of carbon nanotubes so as to expose the arrays of carbon nanotubes; and attaching an anode electrode (50) having a phosphor screen (52) to the above obtained structure.

18 Claims, 4 Drawing Sheets

METHOD FOR MAKING A CARBON NANOTUBE-BASED FIELD EMISSION DISPLAY

BACKGROUND OF THE INVENTION

1. Field of the Invention

The present invention relates to a method for making a field emission display device, and more particularly to a method for making a carbon nanotube field emission display device.

2. Description of Prior Art

Carbon nanotubes are a novel carbonaceous material discovered by Iijima, a researcher of NEC corporation, in 1991. Relevant information was reported in an article by Iijima, entitled "Helical Microtubules of Graphitic Carbon" (Nature, Vol. 354, P56, 1991). Carbon nanotubes can transmit an extremely high electrical current and emit electrons easily at a very low voltage of less than 100 volts, which make it a very promising potential material for field emission applications.

Referring to FIG. 13, U.S. Pat. No. 6,232,706, invented by Hongjie Dai et al., discloses a field emission device using aligned parallel bundles of carbon nanotubes 100 extending from patterned catalyst layers 130 deposited on a layer of porous silicon 120 which is formed on a substrate 110 using a chemical vapor deposition (CVD) process. The carbon nanotubes produced by the CVD process have a variety of heights in a wide range so that the bundles of carbon nanotubes each forms a top which may be flat, concave, or in different pattern since the grown height is neither predictable nor controllable. Furthermore, a thin layer is formed on the top of the bundle which includes nanotubes with a variety of sizes, a number of remaining catalyst particles and amorphous carbon. These defects usually result in uniformity and unreliability of the field emission from the bundles of carbon nanotubes.

In order to optimize electron emissions, a triode-type field emission device is used. U.S. Pat. No. 6,515,415 discloses a typical triode-type field emission device, which generally includes a cathode electrode having carbon nanotube array emitters, an anode electrode with a phosphor screen, and a gate electrode positioned between the cathode electrode and the anode electrode to control emission of electrons from the carbon nanotube array emitters. The carbon nanotube arrays are usually produced using a chemical vapor deposition process.

In order to lower the emission turn-on voltage, a precisely controlled distance between the emitters and the gate electrode is required. Although the carbon nanotubes array growth higher with longer the reaction time, it is very difficult to control the growth height precisely. Therefore, the distance between the emitters and the gate electrodes is difficult to control merely by growth.

SUMMARY OF THE INVENTION

Accordingly, an object of the present invention is to provide a method for making a carbon nanotube-based field emission display device wherein a distance between emission tips and gate electrodes is precisely controllable.

In order to achieve the object set above, a method for making a carbon nanotube-based field emission display device in accordance with a preferred embodiment of the invention comprises the following steps: providing an insulative layer having a first surface; depositing a layer of catalyst on the first surface of the insulative layer; forming a spacer having a plurality of openings therein such that patterned areas of the layer of catalyst are exposed; forming arrays of carbon nanotubes extending from the layer of catalyst in the openings of the spacer; forming a cathode electrode on a top of each of the arrays of carbon nanotubes; forming gate electrodes on a second, opposite surface of the insulative layer offset from the patterned areas; removing portions of the insulative layer corresponding to the arrays of carbon nanotubes so as to expose the arrays of carbon nanotubes; and attaching an anode electrode having a phosphor screen to the above obtained structure. A flatness of the first surface of the insulative layer is less than 1 micron so that the arrays of carbon nanotubes grown therefrom have a same flatness. A thickness of the insulative layer can be controlled through a deposition process so that a distance between the arrays of carbon nanotubes and the gate electrodes is controllable. Preferably, the thickness of the insulative layer is in the range from 1 micron to 1000 microns.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
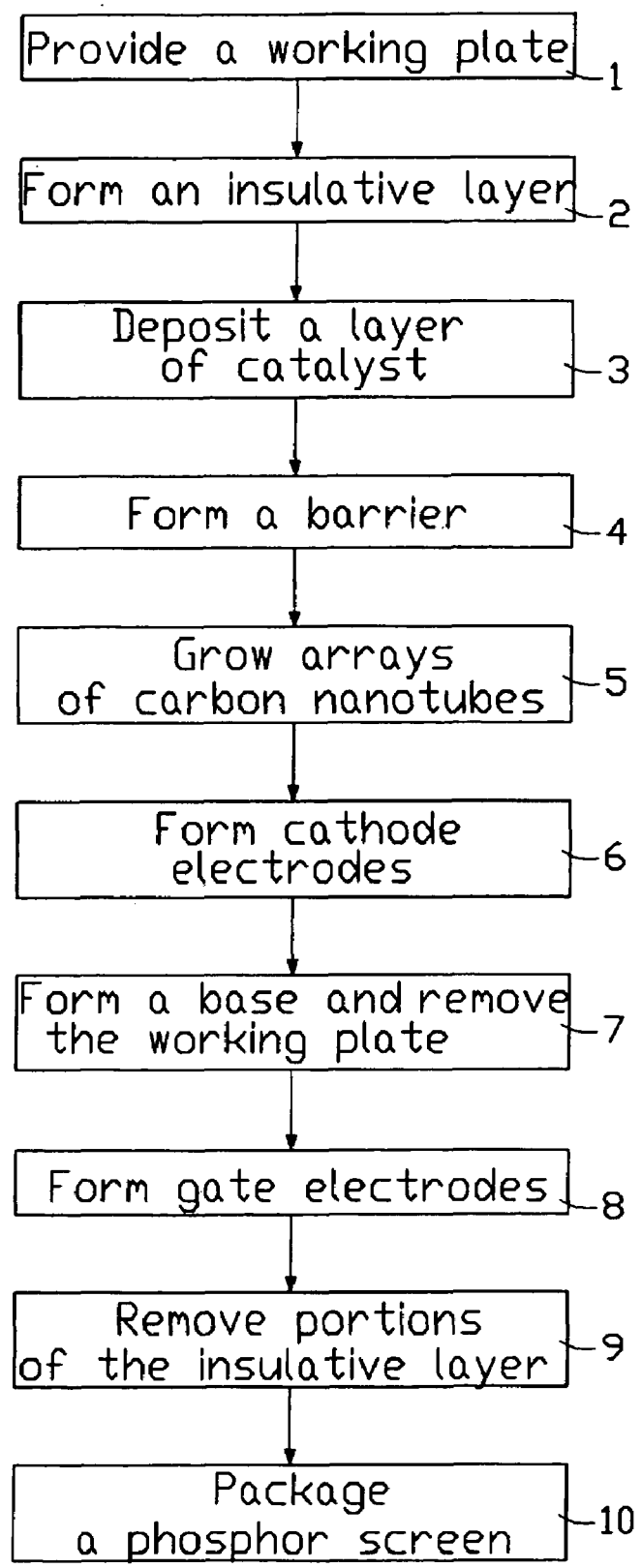
FIG. 1 is a flow chart of a method for making a carbon nanotube-based field emission display device in accordance with a preferred embodiment of the invention.

A preferred method for making a carbon nanotube-based field emission display device in accordance with the invention will be described below with reference to FIG. 1.

Step 1 is providing a working plate. This is an optional step for the purpose of conveniently carrying out the subsequent steps. The working plate can be a nonmetallic material or a metallic material that is sufficiently heat stable to endure high temperatures at which carbon nanotubes are produced.

Step 2 is forming an insulative layer on the working plate. The insulative layer is made of insulative material such as silicon oxide, and has a predetermined thickness. In order to form carbon nanotubes from a common surface, a first surface of the insulative layer should be smooth and flat. Preferably, a variation in flatness of the first surface is less than 1 micron.

Step 3 is depositing a layer of catalyst on the first surface of the insulative layer. Generally, the catalyst is a transition metal such as Fe (Iron), Co (Cobalt), Ni (Nickel), or an alloy thereof. A thickness of the layer of catalyst is in the range from 1 nm to 10 nm, and preferably in the range from 3 nm to 5 nm. Further, the layer of catalyst is preferably annealed at a temperature of 300 degree~400 degree.

Step 4 is forming a barrier on the layer of catalyst. The barrier has a predetermined height according to a height of carbon nanotubes produced in the following step. The height of the barrier is generally in the range from 1 micron to 1000 microns, and preferably in the range from 10 microns to 500 microns. The barrier has a plurality of perforations (not labeled) so as to define a plurality of pixel areas within which carbon nanotubes can subsequently be grown. The material of the barrier should be a heat stable material that can endure the high temperatures at which carbon nanotubes grow. Such material can be heatproof glass, metal coated with insulative material, silicon, silicon oxide, ceramic material, or mica.

Step 5 is growing arrays of carbon nanotubes from the catalyst within the plurality of perforations of the barrier. A preferred chemical vapor deposition process for growing arrays of carbon nanotubes includes: heating carbon-containing gas, such as ethylene or acetylene, to a temperature of about 700 degree, introducing the carbon-containing gas to a reaction region having catalyst pattern, and producing arrays of carbon nanotubes on the catalyst. The reaction is stopped when the arrays of carbon nanotubes have reached or just exceeded the height of the barrier.

Step 6 is forming a cathode electrode on a top of each of the arrays of carbon nanotubes. Generally, the forming of cathode electrodes employs a coating process or chemical deposition of metallic material.

Step 7 is forming a base and removing the working plate. The base is made of insulative material, such as glass, plastic, or ceramic material. The base has an inner configuration complementary with an outer configuration of the cathode electrodes and the barrier, so that the base can be coupled thereto. After removing the working plate, a second surface of the insulative layer is exposed.

Step 8 is forming gate electrodes on the exposed second surface of the insulative layer according to the pixel areas.

Step 9 is removing portions of the insulative layer corresponding to the pixel areas so as to expose the arrays of carbon nanotubes. Electrons emitting from the arrays of nanotubes can thereby pass out from the assembly. A further recommended step is to treat the exposed surfaces of the arrays of carbon nanotubes with a laser to clean the surfaces and improve the uniformity of electron emissions therefrom.

Step 10 is packaging a phosphor screen with an anode electrode onto the assembly to form the assembled carbon nanotube field emission display device.

It is to be understood that the exposed surfaces of the arrays of carbon nanotubes have a same flatness as the first surface of the insulative layer. Further, that a distance between the arrays of carbon nanotubes and the gate electrodes is determined by a thickness of the insulative layer, because a thickness of the layer of catalyst is negligible compared with that of the insulative layer. Accordingly, said distance is precisely controllable through regulation of the deposition of the insulative layer.

Figure 2:
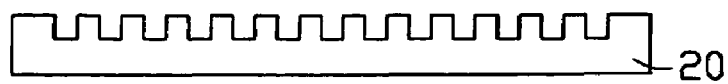
FIG. 2 is a schematic, side elevation view of a working plate having a number of grooves of small size therein.

Referring to FIGS. 2 through 12, each step of the preferred method is described in more detailed below:

Referring to FIG. 2, a working plate 20 is provided with a plurality of grooves (not labeled) define therein, the grooves facilitating subsequent removal of the working plate 20. In order to flatten the surface of the working plate 20, the grooves can be filled with an easily removable material such as wax (not shown).

Figure 3:
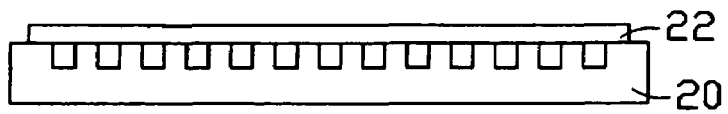
FIG. 3 is a schematic, side elevation view of an insulative layer deposited on the working plate of FIG. 1.

Referring to FIG. 3, a silicon oxide layer 22 is deposited on the working plate 20. The silicon oxide layer 22 has a first surface, and is removable by a wet etching process. Preferably, a variation in flatness of the first surface is less than 1 micron. A thickness of the silicon oxide layer 22 is precisely controllable through the deposition process. The thickness is generally in the range from 1 micron to 1000 microns, and preferably in the range from 10 microns to 200 microns.

Figure 4:
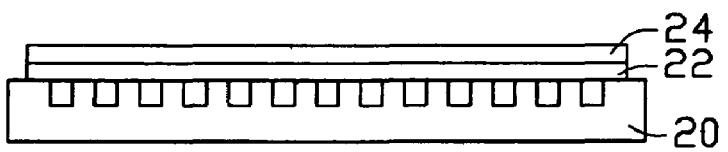
FIG. 4 is a schematic, side elevation view of a protective layer deposited on the insulative layer of FIG. 3.

Referring to FIG. 4, a protective layer 24 is deposited on the silicon oxide layer 22. The protective layer 24 is made of silicon, which can endure wet etching and is removable by a dry etching process. A thickness of the protective layer 24 is in the range from 10 nm to 100 nm.

Figure 5:
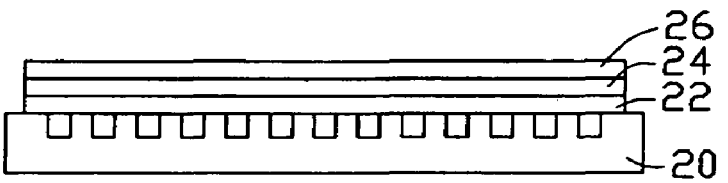
FIG. 5 is a schematic, side elevation view of a layer of catalyst deposited on the protective layer of FIG. 4.

Referring to FIG. 5, a layer of catalyst 26 is deposited with a thickness from 1 nm to 10 nm on the protective layer 24. The catalyst is made of Fe, Co, Ni, or an alloy thereof.

Figure 6:
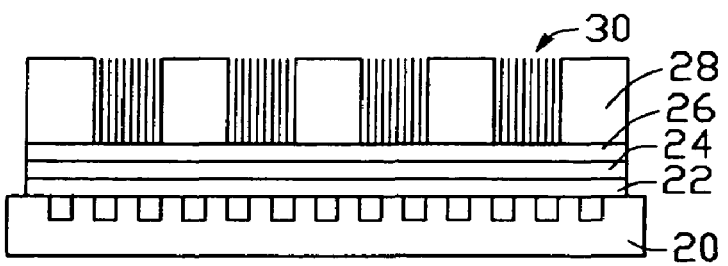
FIG. 6 is a schematic, side elevation view of arrays of carbon nanotubes grown from the catalyst within a plurality of perforations of a barrier formed on the layer of catalyst of FIG. 5.

Referring to FIG. 6, a barrier 28 is formed with a plurality of perforations (not labeled), and carbon nanotube arrays 30 are grown from the layer of catalyst 26 within the perforations. The barrier 28 is made of insulative material, and has a predetermined height in the range from 10 microns to 500 microns. The carbon nanotube arrays 30 are produced by a chemical vapor deposition process, and heights of the arrays 30 are approximately equal to a height of the barrier 28.

Figure 7:
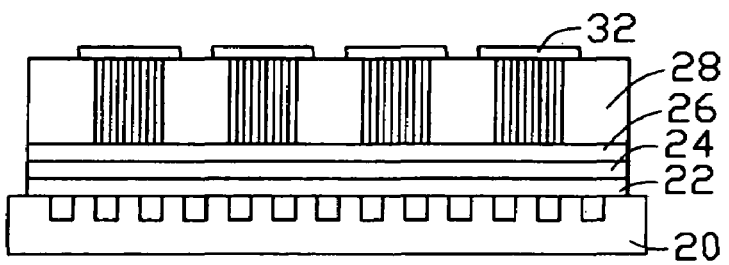
FIG. 7 is a schematic, side elevation view of a plurality of resistive negative feedback layers formed on the corresponding arrays of carbon nanotubes of FIG. 6.

Referring to FIG. 7, a negative feedback layer 32 is formed on a top of each of the carbon nanotube arrays 30, so that the carbon nanotube arrays 30 electrically contact the negative feedback layers 32. The negative feedback layers 32 are made of a material having a suitable resistance, such as silicon or alloys.

Figure 8:
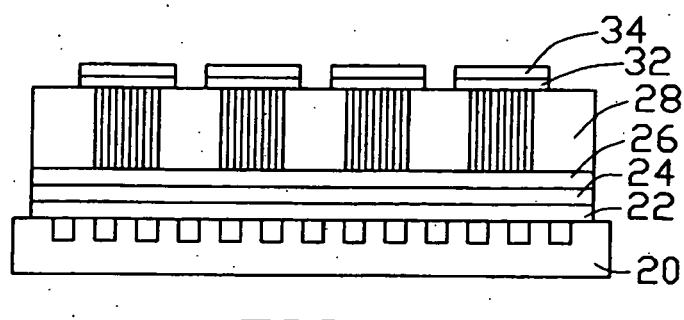
FIG. 8 is a schematic, side elevation view of a plurality of cathode electrodes formed on the corresponding resistive negative feedback layers of FIG. 7.

Referring to FIG. 8, a cathode electrode 34 is formed on each negative feedback layer 32. The cathode electrodes 34 are made of metallic material having a heat expansion coefficient compatible with that of the negative feedback layers 32.

Figure 9:
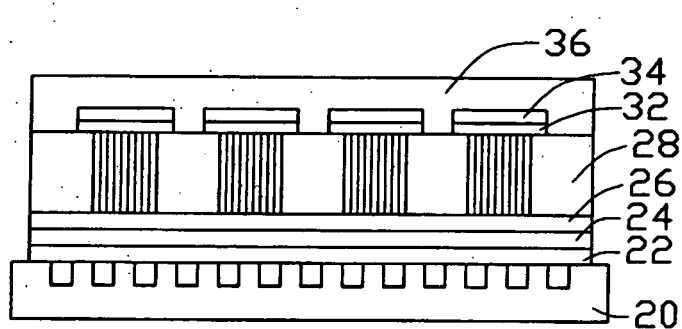
FIG. 9 is a schematic, side elevation view of a base coupled with the cathode electrodes and the barrier of FIG. 8.

Referring to FIG. 9, a base 36 is formed on the cathode electrodes 34. The base 36 is made of insulative material, such as glass, plastic or ceramic material. The base 36 has an inner configuration complementary with an outer configuration of the cathode electrodes 34 and the barrier 28, so that the base 36 can be coupled thereto.

Figure 10:
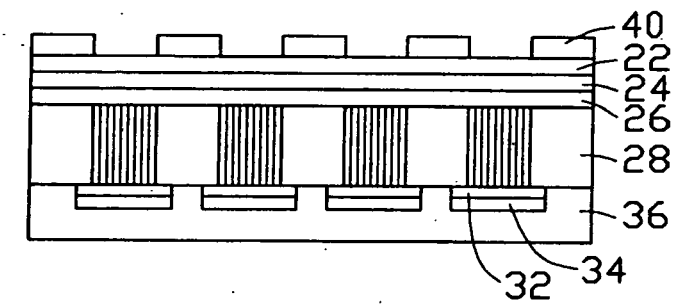
FIG. 10 is a schematic, side elevation view of a number of gate electrodes formed on a second surface opposite to the first surface of the insulative layer after removal of the working plate of FIG. 9.

Referring to FIG. 10, the working plate 20 is removed to expose a second surface of the silicon oxide layer 22. Gate electrodes 40 are then deposited on the second surface offset from the positions of the carbon nanotube arrays 30.

Figure 11:
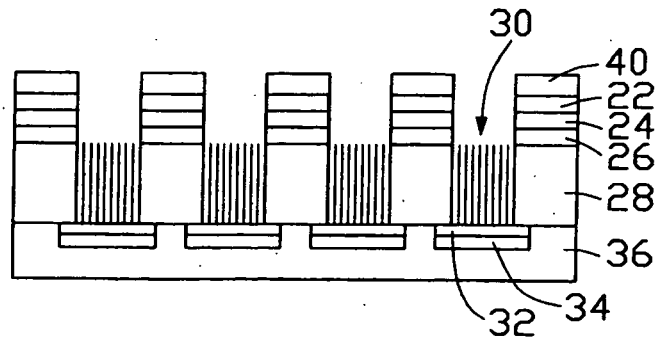
FIG. 11 is a schematic, side elevation view of the assembly of FIG. 10 after removing portions of the insulative layer, the protective layer, and the layer of catalyst.

Referring to FIG. 11, portions of the silicon oxide layer 22 and the protective layer 24 are removed by a wet etching process and a dry etching process respectively. Consequently, the carbon nanotube arrays 30 are exposed. Furthermore, if considered necessary, the carbon nanotube arrays 30 are exposed to laser irradiation in order to clean the surfaces thereof.

Figure 12:
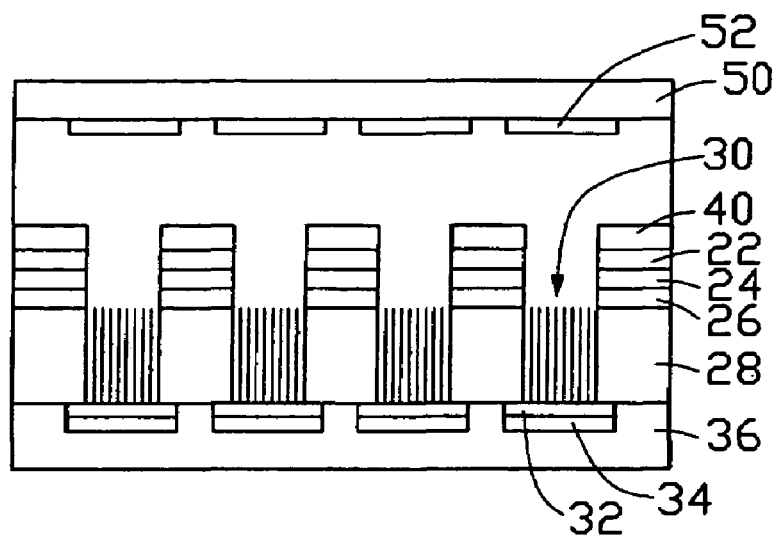
FIG. 12 is a schematic, side elevation view of a carbon nanotube-based field emission display device made by adding a phosphor screen to the device of FIG. 11.
Figure 13:
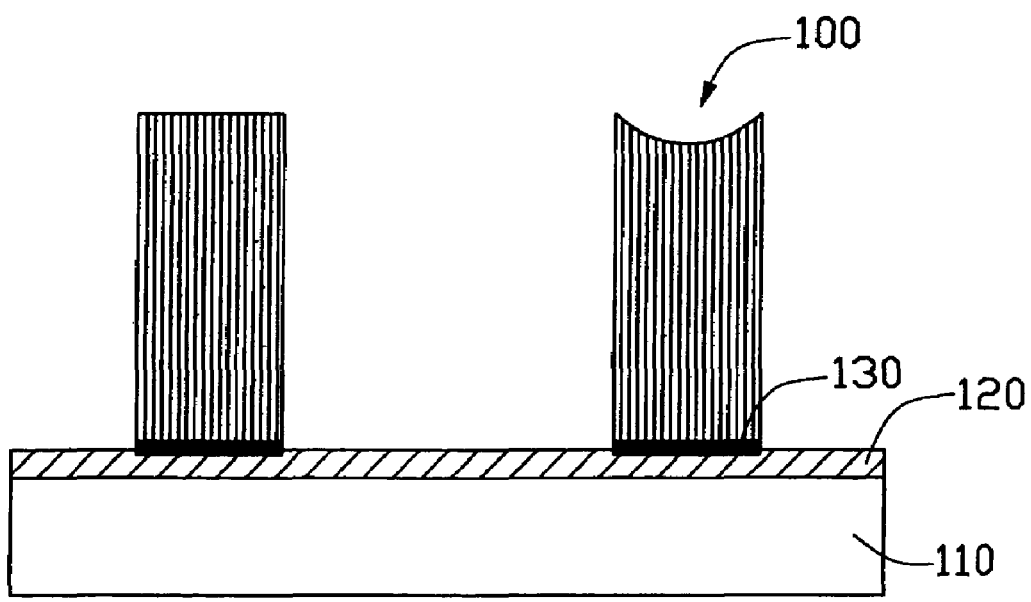
FIG. 13 is a schematic view of a conventional carbon nanotube field emission device.

Referring to FIG. 12, an anode electrode 50 having a phosphor layer 52 is packaged onto the assembly, thereby providing the assembled carbon nanotube-based field emission display device.

In the above-described embodiment, a distance between the gate electrodes 40 and the carbon nanotube arrays 30 is mainly determined by the thickness of the silicon oxide layer 22, because the nano-scale thicknesses of the protective layer 24 and the catalyst layer 26 are both negligible compared with the micron-level thickness of the silicon oxide layer 22. The uniformity of the exposed surfaces of the carbon nanotube arrays 30 is thus mainly determined by a flatness of the protective layer 24.

It should be noted that the working plate 20 and the protective layer 24 are both optional for practicing the present invention. In addition, the negative feedback layer 32 is an optional element for adjusting resistance if necessary.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A method for making a carbon nanotube-based field emission display, comprising steps of:
   providing an insulative layer having a first surface;
   depositing a layer of catalyst on the first surface of the insulative layer;
   forming a spacer having a plurality of openings therein such that patterned areas of the layer of catalyst are exposed in the openings;
   forming arrays of carbon nanotubes extending from the layer of catalyst in the patterned areas;
   forming cathode electrodes on tops of the arrays of carbon nanotubes;
   forming gate electrodes on a second, opposite surface of the insulative layer offset from the patterned areas;
   removing portions of the insulative layer corresponding to the arrays of carbon nanotubes so as to expose the arrays of carbon nanotubes; and
   attaching an anode electrode having a phosphor screen to the above obtained structure.

2. The method as described in claim 1, wherein a flatness of the first surface of the insulative layer is less than 1 micron.

3. The method as described in claim 1, wherein a thickness of the insulative layer is in the range from 1 micron to 1000 microns.

4. The method as described in claim 3, wherein the thickness of the insulative layer is in the range from 10 microns to 200 microns.

5. The method as described in claim 1, wherein a thickness of the catalyst layer is in the range from 1 nanometer to 10 nanometers.

6. The method as described in claim 1, wherein the spacer is made of heatproof glass, insulative material coated metal, silicon, silicon oxide, ceramic or mica.

7. The method as described in claim 1, wherein a height of the spacer is in the range from 1 micron to 1 mm.

8. The method as described in claim 7, wherein the height of the spacer is in the range from 10 microns to 500 microns.

9. The method as described in claim 1, wherein a height of the arrays of carbon nanotubes is approximately equal to that of the spacer.

10. The method as described in claim 1, wherein each cathode electrode further includes a negative feedback layer.

11. A method for making a carbon nanotube-based field emission display, comprising steps of:
    providing an insulative layer having a first surface;
    depositing a protective layer on the insulative layer;
    depositing a layer of catalyst on the protective layer;
    forming a spacer having a plurality of openings therein such that patterned areas of the layer of catalyst are exposed in the openings;
    forming arrays of carbon nanotubes extending from the layer of catalyst in the patterned areas;
    forming a cathode electrode on a top of each of the arrays of carbon nanotubes;
    forming a base having an inner contour mates with an outer contour of the cathode electrodes and the spacer so as to couple to the cathode electrodes and spacer;
    forming gate electrodes on a second, opposite surface of the insulative layer offset from the patterned areas;
    removing portions of the protective layer and the insulative layer corresponding to the arrays of carbon nanotubes so as to expose the arrays of carbon nanotubes; and
    attaching an anode electrode having a phosphor screen to the above obtained structure.

12. The method as described in claim 11, wherein a flatness of the first surface of the insulative layer is less than 1 micron.

13. The method as described in claim 11, wherein a thickness of the insulative layer is in the range from 1 micron to 1000 microns.

14. The method as described in claim 11, wherein a thickness of the protective layer is in the range from 10 nanometers to 100 nanometers.

15. The method as described in claim 11, wherein the insulative layer and the protective layer are removed by wet etching and dry etching respectively.

16. The method as described in claim 11, wherein a thickness of the layer of catalyst is in the range from 1 nanometer to 10 nanometers.

17. The method as described in claim 11, wherein the method further includes a step of cleaning the exposed surface of the arrays of carbon nanotubes after removing the portions of the protective layer and the insulative layer.

18. A method of making a carbon nanotube-based field emission display, comprising steps of:
    providing a catalyst layer;
    forming a barrier on the catalyst layer;
    growing arrays of carbon nanotubes beside the barrier on the catalyst layer;
    applying a cathode electrode upon the arrays of carbon nanotubes under a condition that the cathode electrode is supported by the barrier;
    removing portions of the catalyst layer;
    providing a gate electrode under the arrays of carbon nanotubes; and
    locating an anode electrode spatially away from the arrays of carbon nanotubes, opposite to the cathode electrode.

* * * * *